United States Patent [19]

Efros

[11] Patent Number: 4,666,174
[45] Date of Patent: May 19, 1987

[54] WIDE POWERFUL RANGE BICYCLE

[76] Inventor: Boris Efros, 920 N. Stanley Ave., #202, Los Angeles, Calif. 90046

[21] Appl. No.: 816,292

[22] Filed: Jan. 6, 1986

[51] Int. Cl.⁴ .............................................. B62M 1/04
[52] U.S. Cl. .................... 280/258; 188/24.12
[58] Field of Search ............... 280/258, 255, 254, 253, 280/246, 244; 188/24.11, 24.12, 24.17

[56] References Cited

U.S. PATENT DOCUMENTS

| 4,077,648 | 3/1978 | Seul | 280/255 |
| 4,272,096 | 1/1981 | Efros | 280/255 |
| 4,300,784 | 11/1981 | Efros | 280/255 |
| 4,421,334 | 12/1983 | Efros | 280/255 |
| 4,574,649 | 3/1986 | Seol | 280/255 |

FOREIGN PATENT DOCUMENTS

| 266871 | 2/1929 | Italy | 188/24.12 |
| 132981 | 9/1951 | Sweden | 188/24.12 |
| 2106204 | 4/1983 | United Kingdom | 188/24.12 |

Primary Examiner—John A. Pekar
Attorney, Agent, or Firm—Poms, Smith, Lande & Rose

[57] ABSTRACT

A pedal lever type bicycle includes a pedal lever having a front portion and a rear portion, with an intermediate pivot point located substantially above the center of the rear wheel, and to the rear of the front of the rear wheel. The rear portion of the pedal lever has a dog-leg configuration, with the slider, which is attached to the drive chain, being mounted on a straight section of the rear portion of the pedal lever which extends slightly above and to the rear of the rear wheel hub, so that the chain exerts a force to move the slider outwardly on the rear portion of the pedal lever when it is in the lower position, and in the opposite direction when it is raised. Changes of mechanical advantage of 3 or 4 to 1 are available with this configuration of the pedal lever. Further, the rear brake is mounted on the lower rear portion of the frame, to avoid interference with the pedal lever.

17 Claims, 6 Drawing Figures

WIDE POWERFUL RANGE BICYCLE

FIELD OF THE INVENTION

This invention relates to pedal lever type bicycles.

BACKGROUND OF THE INVENTION

My prior designs of pedal lever bicycles are disclosed in U.S. Pat. Nos. 4,272,096; 4,300,784 and 4,421,334. Another type of pedal lever bicycle which has been advertised and shown at bicycle shows is that advertised by a company known as Alenax.

While my prior bicycles were much more efficient than conventional bicycles, some minor disadvantages were found to be present in these revolutionary bicycles. Specifically, with the rear wheel brake located toward the front top of the rear wheel, a bridge was required across between the two rear frame members, and some design compromises were required to avoid interference between the upwardly swinging rear end of the pedal lever and the bridge and associated brake. In addition, with the configuration of the pedal lever as shown in my prior patents, it was not practical to change the "gear ratio" over as broad a range as might be preferable. In addition, the Alenax bicycle had a pedal lever location and configuration wherein the rear portion of the pedal levers could interfere with or strike the bicycle riders' legs.

Accordingly, the principal object of the present invention is to provide a clean overall mechanical design for a pedal lever bicycle which obviates all of the disadvantages mentioned hereinabove, and permits extremely wide changes in mechanical advantage, or "gear ratio".

SUMMARY OF THE INVENTION

In accordance with the present invention, a pedal lever bicycle of the general type discussed hereinabove includes a pedal lever having a front portion and a rear portion, with a substantially central pivot point located to the rear of the front of the rear tire and at an elevation substantially above that of the center of the rear wheel. In addition, the rear portion of the pedal lever may have a dog leg type configuration, with a short upwardly directed section near the pivot point, and an elongated portion extending to the rear, on which the power ratio adjusting slider, attached to the drive chain, is mounted.

With this arrangement, an extended range of power ratios may be obtained as a result of the long available range of movement of the slider, and the slider may be positively and easily moved as the bike is being pedalled.

Other features which contribute to the mechanical simplicity and efficacy of the new design may include any or all of the following:

(1) The rear brake is mounted low on frame and engages the rear wheel at an elevation near that of the center of the wheel. This position of the rear brake eliminates the need for a bridge, avoids possible interference with the pedal lever, and simplifies the overall bicycle design.

(2) The frame can be relatively small, and correspondingly light weight, with the front and rear wheels being at virtually any desired spacing.

(3) The front and rear ends of the pedal lever may be substantially aligned with the pedal lever pivot point.

(4) The downward travel of the pedal levers may be limited by an adjustable stop engaging the short dog leg section of each pedal lever.

(5) An idler wheel may be employed in the coupling of each chain to a spring attached to the forward portion of the corresponding pedal lever.

(6) The travel of the forward part of the pedal lever may be through an arc of about ninety degrees, or somewhat more than ninety (90) degrees in the angular range where the bicycle rider may exert the maximum power from the legs to drive the bicycle forward.

(7) The rider's seat may be mounted only slightly forward of the rear hub, thereby permitting a shorter wheel base, a smaller lighter frame, and better handling of the bicycle.

(8) The front portions of the pedal levers are angled outwardly from the closely spaced pedal lever pivot mounting points, to provide clearance past the brake assembly, and to permit the rear portion of the pedal levers to be spaced close in to the center of the bicycle, thereby making the rear hub design more compact.

The new design has the advantage that the bicycle seat may be mounted further to the rear than normal, just in front of the rear wheel hub, thereby providing better handling, and permitting a shorter wheelbase and a smaller and lighter frame than is possible with prior designs.

Other objects, features, and advantages will become apparent from a consideration of the drawings and the following detailed description.

DETAILED DESCRIPTION

Figure 1:
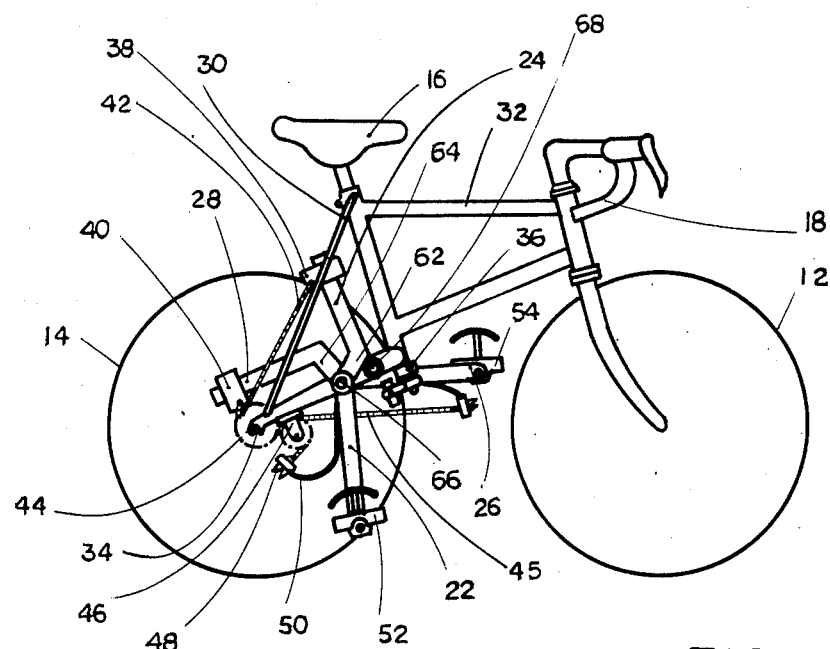
FIG. 1 is a side view of a preferred embodiment of a pedal lever bicycle illustrating the principles of the present invention.

Referring more particularly to the drawings, FIG. 1 shows a bicycle having a front wheel 12, a rear wheel 14, a seat 16, and handle bar 18. The bicycle is propelled by means of a pair of pedal levers, with one of the two pedal levers having a front portion 22 and a rear portion 24, while the other of the two pedal levers has a front portion 26 and a rear portion 28. Two frame members 30 extend from the frame 32 of the bicycle to the rear hub 34. The brake 36 for the rear wheel of the bicycle is mounted at a low point on the frame 32 so that it engages the rim of the rear wheel 14 near the forward portion thereof. With this arrangement, there is no need for a bridge across between the two rear struts 30, which might otherwise interfere with free movement of the rear portions 24 and 28 of the pedal levers.

In order to change the "gear ratio" of the bicycle, or its mechanical advantage, sliders 38 and 40 are mounted on straight rear sections of the rearwardly extending portions 24 and 28 of the pedal levers. Secured to the slider 38 is a chain 42 which extends over a sprocket 44 mounted on the rear hub 34 of the bicycle. The sprocket 44 applies power to the wheel 14 through a clutch, which is not shown. A separate corresponding chain 45, intercouples the slider 40 with a second sprocket which in turn applies power to the wheel through a separate clutch. The other end of the chain 42 goes over an idler wheel 46 and is secured at point 48 to a spring 50 which is in turn secured to the front portion 22 of the pedal lever.

The front portions 22 and 26 of the pedal levers are provided with pedals 52 and 54, respectively, each including arrangements for engaging the top of the foot, so that the pedals may be readily restored to their upward positions. In this regard, it may be noted that each of the pedals is independent in its mode of operation from the other pedal so that the two pedals can be actuated in unison, alternately, or using only one pedal, as may be desired or as may prove convenient for the rider. This is in contrast to many pedal lever bikes wherein the two pedal levers are intercoupled by complex linkages or cables, making for a less convenient and less flexible mode of operation of the bicycle, as well as involving increased complexity.

An important feature of the embodiment of FIG. 1 is the dog-leg section 62 in the rear portion 24 of one of the pedal levers and the corresponding dog leg portion 64 in the other rear portion 28 of the other pedal lever. This configuration provides more positive actuation of the sliders 38 and 40 to change gear ratios, while the rider continues to pedal the bicycle. More specifically, with the dog leg configuration, more positive downward pressure is applied to the slider 38 by the chain 42, when the pedal lever is in its upward position as indicated at 24 in FIG. 1 of the drawings. Similarly, when the pedal lever is in its lower position as indicated by the rear portion 28 in FIG. 1, positive rearward force is applied by the chain to the slider 40. This configuration provides an extremely long range of travel for the slider giving a gear ratio of approximately 3.7 to 1. Further, as mentioned above, positive shifting may be accomplished while the bicycle rider continues pedalling.

It may also be noted that the pivot point 66 for the two pedal levers is located well above the center of the hub 46 of the rear wheel, and is also located well behind the front of the rear wheel. The eccentric stop 68 may be made of fairly stiff rubber or other resilient material and engages the front of the dog leg portions 62 of the pedal lever as the rear portion of the pedal lever moves forward.

Figure 2:
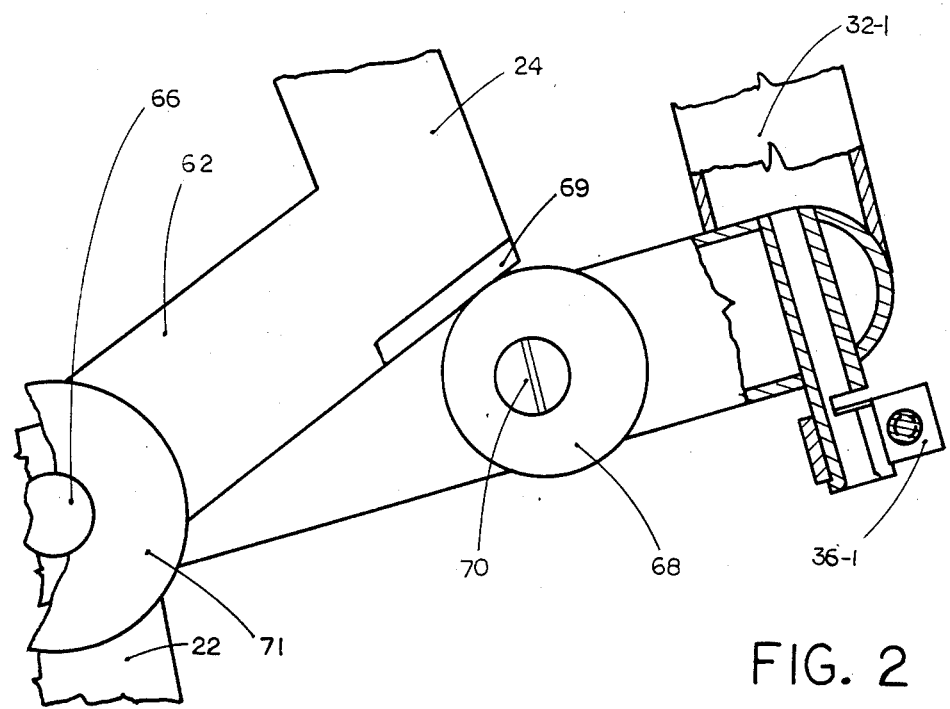
FIG. 2 is an enlarged showing of that portion of the bicycle of FIG. 1 including the pedal lever pivot point and an eccentric stop for adjustably limiting movement of the pedal lever.

FIG. 2 is an enlarged showing of a portion of FIG. 1, particularly including the pivot point 66 for the two pedal levers, and one of the stops 68, for engaging the stop plate 69 secured to the front portion of the dog leg section 62 of the rear portion 44 of one of the pedal levers. If desired the top plate 69 could be omitted with the stop engaging the main portion of the pedal lever directly. It may be noted that the stop 68 is eccentric, so that the limitation on travel of the pedal lever 24 may be readily adjusted.

The brake bracket 36-1, as shown in FIG. 2 of the drawings, is conneced to the lowermost portion of the bicycle frame designated 32-1 in FIG. 2. As mentioned above, this location of the brake toward the forward portion of the wheel, frees the space between the two rearwardly extending struts or brace members 30, and avoids the need for a bridge between the two members 30, which might otherwise interfere with the upward movement of the rear portions 24 and 28 of the pedal levers.

As mentioned above, the stop 68 may be adjusted by rotating it to thereby provide a different stop position for the pedal lever. Following appropriate rotational adjustment of the eccentric stop member 68, it may be held in position by tightening the screw 70.

The central portion 71 of the pedal lever interconnects the front portion 22 and the rear portion 24 of the pedal lever, and may contain suitable bearings.

Figure 3:
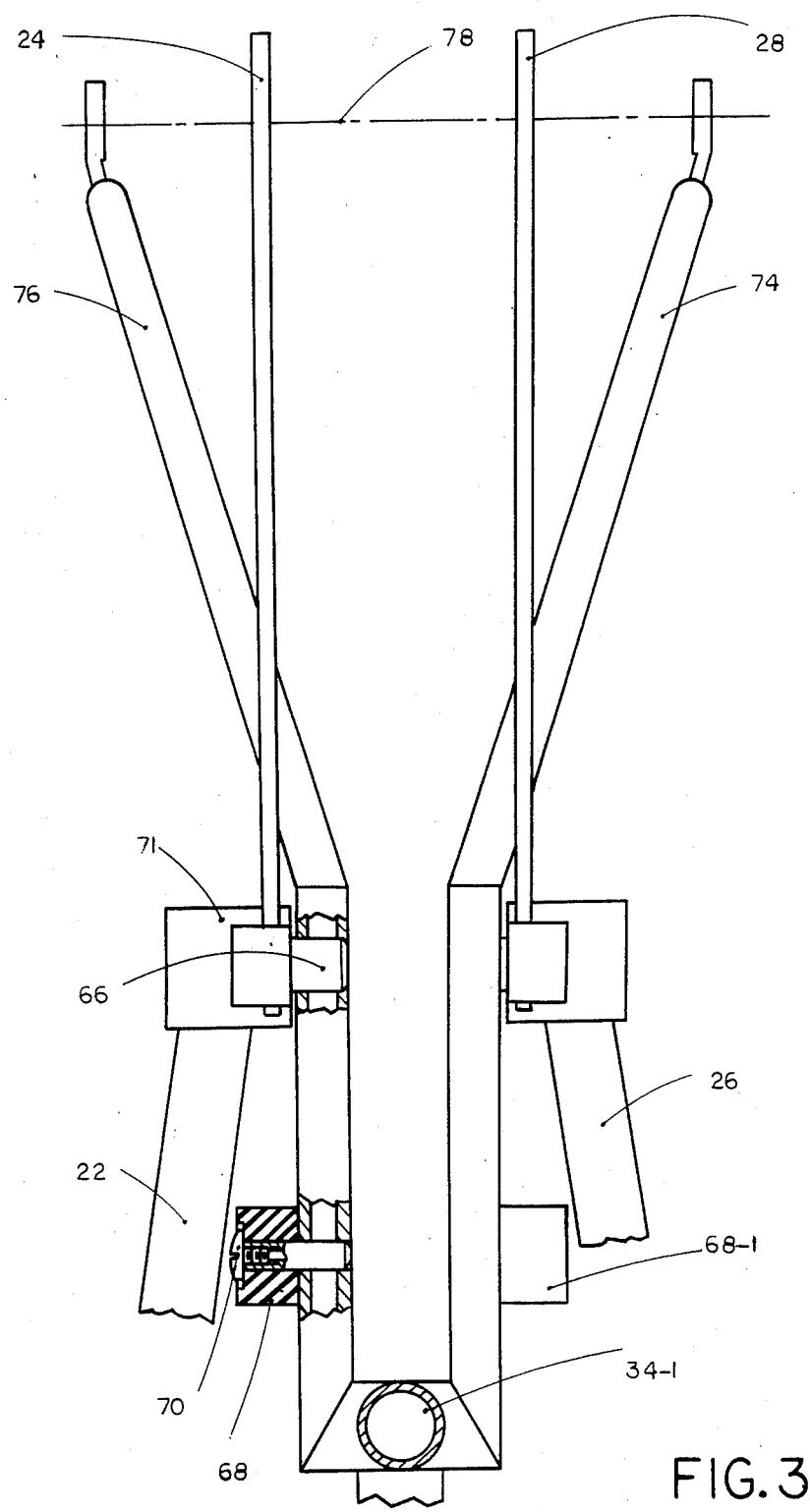
FIG. 3 is a transverse partial cross-sectional view through the bicycle of FIG. 1, particularly extending through the center of the pivot point and also of the stop.

FIG. 3 is a partial cross-sectional view taken through the pivot point 66 of the two pedal levers and through the center of the stops 68. Visible in FIG. 3 are the forwardly extending portions 22 and 26 of the two pedal levers and the correspondingly rearwardly extending portions 24 and 28, respectively. It may be noted that the rearwardly extending portions of the pedal levers 24 and 28 may be relatively thin in the horizontal direction but moderately wide in the vertical cross section direction, in order to provide adequate strength. It may also be noted that these two rearwardly extending portions 24 and 26 may be spaced fairly close together, such as $2\frac{3}{4}$ or 3 inches apart, which clearly precludes interference with the leg movements. Little transverse thickness is required of these rear portions, as there is virtually no lateral force on these rear portions of the pedal levers. However, the forwardly extending portions 22 and 26 of the pedal levers must withstand considerable torque as well as force in the vertical direction; accordingly, they are of oval or circular cross sections and have moderately heavy wall thickness, to stand the strain. Also shown in FIG. 3 are the rearwardly extending frame members 74 and 76 which coupled from the lower end 34-1 of the frame to the center of the rear wheel, which lies along the line 78, as shown in FIG. 3.

It may be noted that these rearwardly extending frame members 74 and 76 extend close to the wheel up to the pivot points, which are outside of these frame members, and then flare outwardly to support the rear wheel hub.

Figure 4:
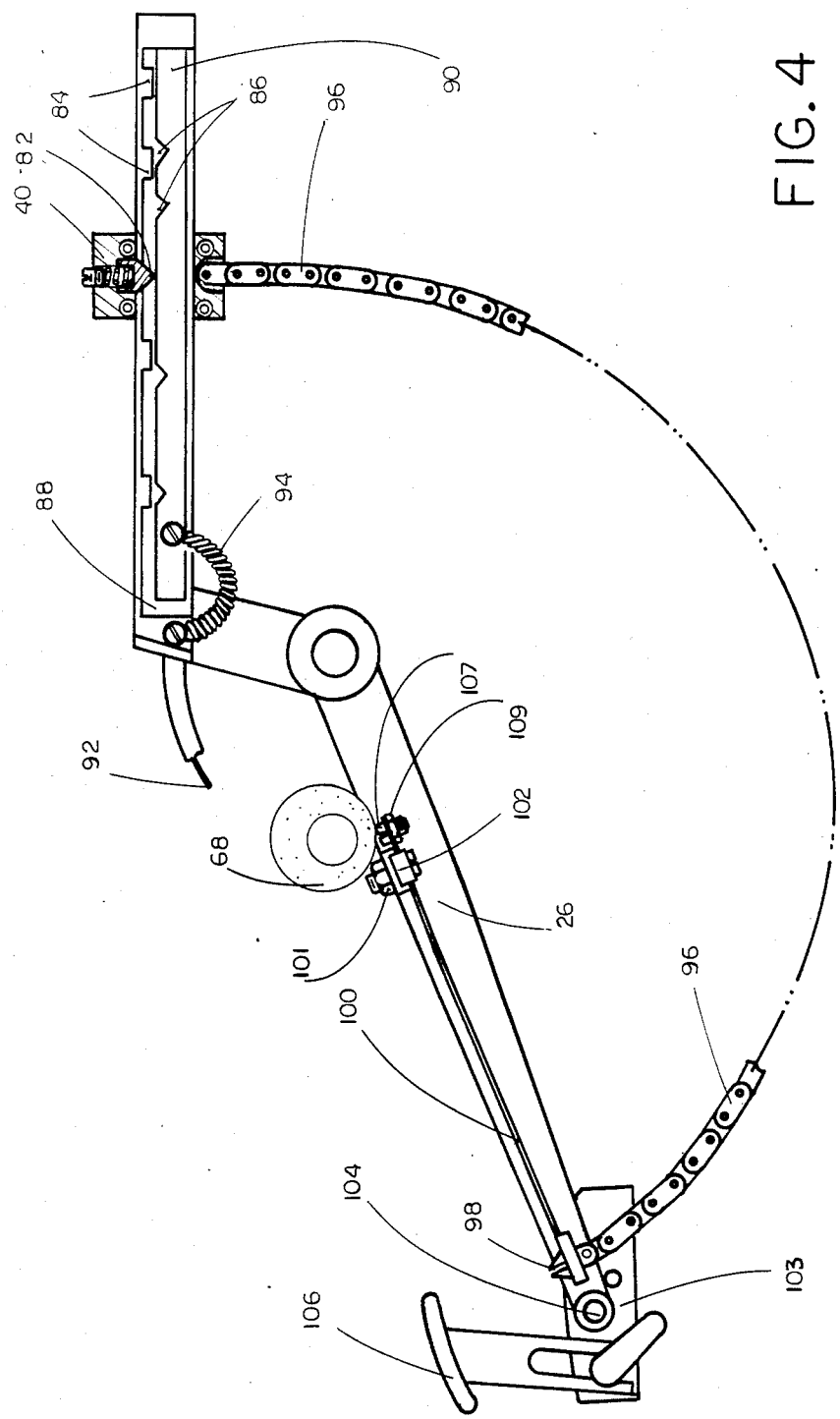
FIG. 4 is a side view of a pedal lever assembly including both the front pedal portion of the lever and the rear portion thereof including the gear shifting mechanism.

FIG. 4 is a side view of one of the pedal levers, showing it in somewhat greater detail than was possible in the assembly drawing of FIG. 1. More specifically, FIG. 4 is a view which would be from the rear of the bike as it is shown in FIG. 1, with the front portion 26 of the pedal lever extending to the left in FIG. 4, and the rear portion 28 of the pedal lever extending to the right in FIG. 4. The slider 40 is adjustable to various positions along the length of the rear portion of the pedal lever 28, with the spring biased detent 82 holding the slider 40 into the position as determined by the alignment of the notches 84 and 86 in the fixed member 88 and the relatively movable member 90. More specifically, the movable member 90 selects the appropriate one of the notches 84, and displaces the lower tapered end of the detent 82 as the member 90 is shifted longitudinally. Incidentally, the member 90 is shifted longitudinally under the control of cable 92, and the spring 94. The slider then is free to move along the length of the rear portion 28 of the pedal lever until the spring biased detent 82 drops it into locking engagement with one of the recesses 84. Incidentally, this changing of gear ratios or mechanical advantage ratios may be accomplished while the rider is continuing to pedal the bicycle. It is further noted that mechanisms of the type disclosed and discussed hereinabove, are described in great detail and form the principal subject matter of my prior U.S. Pat. No. 4,421,334, cited hereinabove.

It may also be noted that the chain 96, after passing over the sprocket on the rear hub and the idler sprocket, is connected by the clamp 98 to the leaf spring 100 which is mounted by the bracket 102 to the front portion 26 of the pedal lever. The leaf spring 100 may be adjusted laterally in bracket 102 and is then locked in place by the threaded fastener 101.

Incidentally, the pedal 103 is pivotally mounted at point 104 to the front end of the forward portion 26 of the pedal lever. The member 106 is provided to engage the upper portion of the foot, or the toes, in order to raise the front portion of the pedal lever to its upward position, to start the power cycle again.

Concerning another design feature, the eccentric stop 68 serves as a stop for both directions of travel of the pedal lever. Thus, in FIG. 4, the stop 68 is shown in engagement with the adjusting screw 107 which is threaded into nut 109 which is in turn secured to a short extended portion of spring 100.

Figure 5:
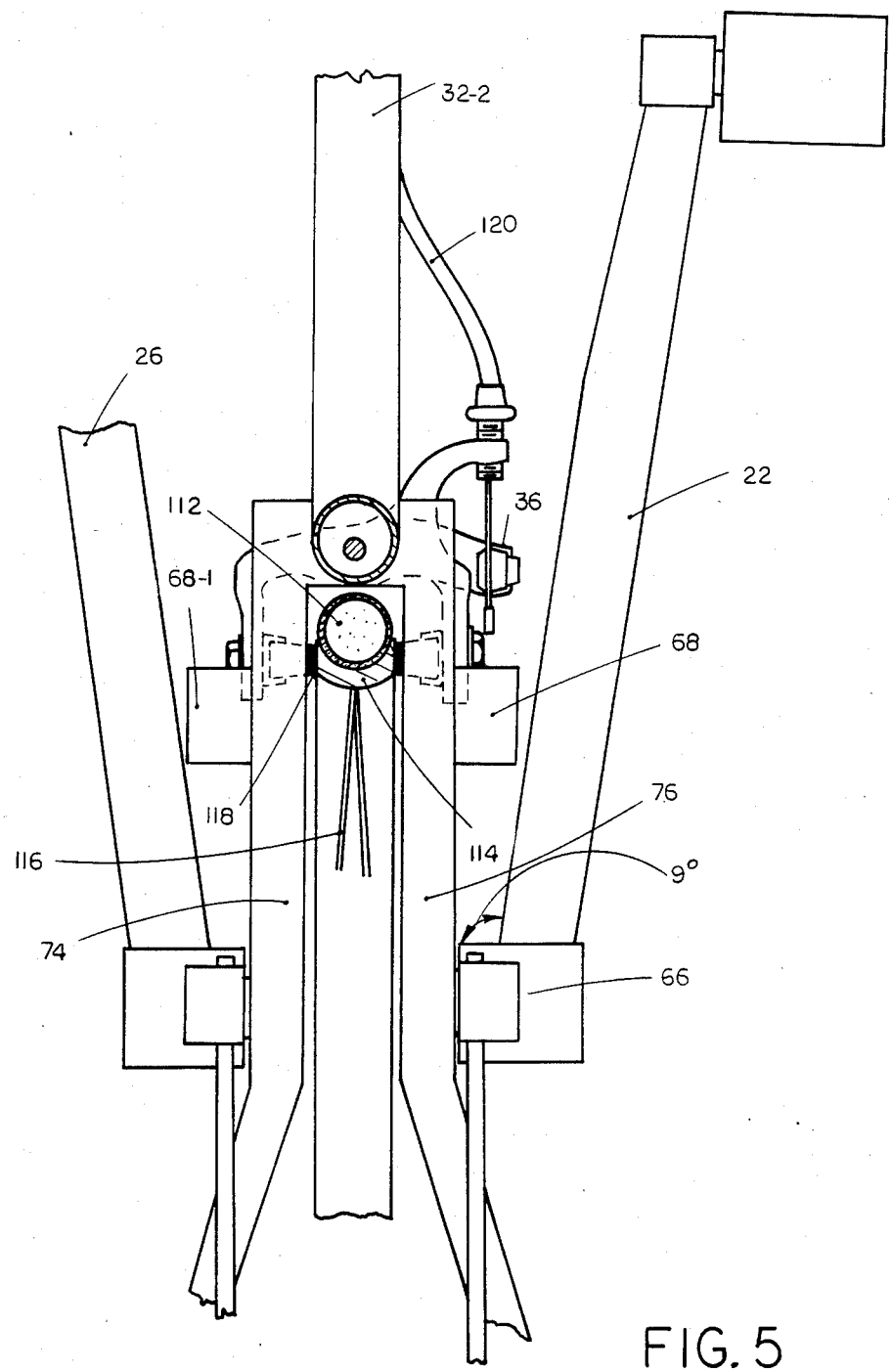
FIG. 5 is a partial cross-sectional view showing the mounting configuration.

FIG. 5 is a view similar to that of FIG. 3 but brings out the arrangements for mounting the brake 36 in somewhat greater detail. Shown in FIG. 5 are the bicycle tire 112, the bicycle rim 114, and the bicycle spokes 116. The brake 36 is conventional, and includes the two brake pads 118 which are brought into engagement with the two sides of the wheel rim 114 under the control of the brake cable 120. As mentioned above, the brake assembly 36 is mounted as shown in FIG. 2, at one of the lowermost points of the frame.

Figure 6:
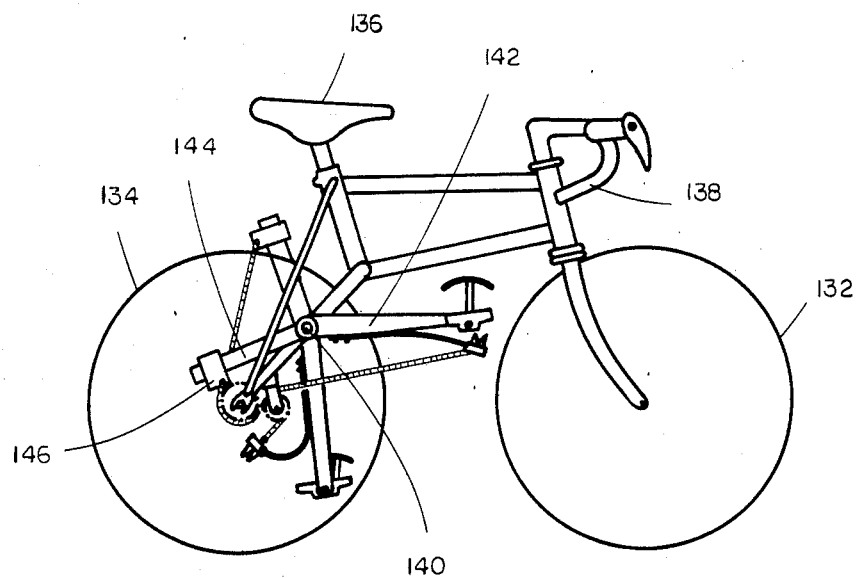
FIG. 6 is a side view of an alternative embodiment of the invention.

FIG. 6 shows another alternative embodiment of the invention, including a front wheel 132, a rear wheel 134, a seat 136, and a handle bar 138. As shown in connection with the embodiment of the invention of FIGS. 1 through 5, it is desirbale that the rear portion of the pedal lever be relatively straight to accommodate a long travel of the sliders, and that the very rear end of the rear portion of the pedal lever terminate close to the rear hub. Further, it is desirable that the straight rear portion of the pedal lever on which the slider moves, tilts slightly upwardly away from the hub to a point at least 4 inches above the center of the hub, when the rear portion of the pedal lever is in its furtherest downward position, so that the slider will have a positive force tending to move it toward its rearmost position. In addition, to shift gear ratios in the opposite direction, the slider should have a downward force exerted on it by the chain when the straight rear portion of the pedal lever is in its furthest upraised position. In the embodiment of FIGS. 1 through 5 of the drawings, this was accomplished through the use of a dog leg type configuration, which is to be preferred. However, in FIG. 6, an alternative arrangement for accomplishing much the same function is disclosed. More specifically, the pedal lever central pivot point 140 is raised to a significantly higher point, close to where the upper end of the dog leg portion of the pedal lever of FIG. 1 was located, and the pedal lever has a relatively long forward portion 142 extending forward toward the pedal, and a relatively shorter rear portion 144 which is straight, and on which the slider 146 is mounted. With this alternative arrangement, the functions discussed hereinabove may also be accomplished, although in a somewhat less ideal arrangement than that shown in the embodiment of FIGS. 1 through 5 of the drawings.

Concerning the dimensions included in the bicycle, reference will primarily be made to the embodiment of FIGS. 1 through 5 of the drawings. In general, the bicycle will be described in terms of a full size bicycle having wheels which are 27 inches in diameter, rather than a child's bicycle. However, on a generalized basis, the dimensions given for full size bicycle would be scaled down for a child's bicycle. The wheel base, the distance between the centers of the two wheels, may be in the order of 38 inches; however, this could range to as short as about 36 inches, and the widest separation is substantially unlimited. Concerning the pedal lever, the forward portion of the pedal lever is approximately 12 inches from the pivot point of the pedal lever to the pivot point of the pedal itself, but it will be expected that the distance could range from about 9 to 13 inches for the bicycle of FIG. 1. Concerning the rear portion of the pedal lever, on which the slider moves, this may be at least 10 inches in length, but more generally could be from about 9 inches to about 11½ inches in length. It may also be noted that the slider when in its rearmost position as indicated by the slider 40 in FIG. 1, is close to the hub of the bicycle, substantially as close as practical without mechanical interference. In addition, when the sldier is in its fully forward most position, and the rear portion of the pedal lever is in its farthest back or counterclockwise position as shown in FIG. 1, the slider is in the order of 6 inches above the center of the rear wheel. On a more general basis, it would be expected that the slider could be from 4 to 10 inches above the center of the rear wheel, when it is in its forwardmost position and the rear portion of the pedal lever is in its furthest downward location. Concerning another matter, the front portion of the pedal lever normally travels through an arc of approximately 90 degrees, but this may range from about 85 degrees to 100 degrees in the normal course of design, and adjustments of the stop. The lowerost position of the pedals should be 4 to 6 inches above the ground to provide adequate clearance on turns, and the toes of the rider when extending past the pedal, must not interfere with the rear of the front wheel in the course of turns. Concerning the frame of the bicycle, it may be significantly reduced as compared with conventional bicycle frames. Thus, the lowermost portion of the rigid frame is that which supports the rear hub of the bicycle. The brake 36 as shown in FIG. 1 is mounted on the lowermost point of the central portion of the frame but this is substantially above the rear hub, as is the pivot point 66 for the pedal levers. The pivot point is approximately 3½ inches above the center of the rear wheel, but in practice could be from about 2½ to 10 inches, considering the design of FIG. 6, as well as that of FIG. 1 of the drawings. It may also be noted that the position of the seat 16 is close to and just in front of the center of the rear wheel, thereby permitting a smaller frame for the overall bicycle, and providing better handling for the bike. Further, the pedal in its foward and upward position is somewhat above the horizontal, and this may range from about 3 degrees to about 30 degrees, depending on design parameters. It is also desirable that the straight rear section of the rear portion of the pedal lever on which the slider moves, tilts downwardly toward the rear hub, in its extreme downward position, and this angle can be in the order of 10 degrees, by way of example.

In conclusion, it is to be understood that the foregoing detailed description and the accompanying drawings relate to preferred and alternative embodiments of the invention. However, various features of the invention may be implemented in manners other than those precisely as shown in the present drawings. Thus, for example, the mechanical advantage of the bicycle may be changed in accordance with other constructions shown in my prior patents. In addition, the stop may be shifted in its position by arrangements other than the eccentric as shown at 68 in the drawings. Accordingly, it is to be understood that the present invention is not limited precisely to that shown and described in detail hereinabove.

What is claimed is:

1. A pedal lever bicycle having a wide range of mechanical advantage ratios, comprising:

a front wheel, a rear wheel, and a frame interconnecting said front and rear wheels;

a pair of pedal levers each having front and rear portions;

central pivoting mounting means for said pedal levers mounted at an elevation above the center of the rear wheel, and behind the front of the rear wheel;

sprocket means mounted coaxially with said rear wheel for driving said bicycle;

chain means for engaging said sprocket means to supply power to said sprocket from said pedal lever;

slider means mounted for movement on said rear portion of each said pedal lever and connected to one end of said chain means;

said rear portion of each said pedal lever being of a dog-leg configuration with an initial short portion, having a length less than one-third of the total length of said rear portion of said pedal lever, extending sharply upward relative to the front portion of said pedal lever, when said front portion of said pedal lever is substantially in the horizontal orientation;

means for providing a force from said chain toward moving each slider toward said pivoting mounting means when said rear portion of the associated pedal lever is in the raised position, and for providing a force on each said slider in the opposite direction when said rear portion is in its lower position; and means for constraining the movement of the rear portion of each of the pedal levers to the rear of the normal position of a rider's legs.

2. A pedal lever bicycle as defined in claim 1 further comprising a rear brake mechanism, and means for mounting the rar brake mechanism toward the front of the rear wheel at a low point on the frame, whereby interference with the rear portion of the pedal lever is precluded.

3. A pedal lever bicycle as defined in claim 1 further comprising resilient stop means for engaging said dog leg portion of said pedal lever to limit the stroke of said pedal lever.

4. A pedal lever bicycle as defined in claim 3 wherein said resilient stop means has an eccentric mounting configuration.

5. A pedal lever bicycle as defined in claim 1 wherein the wheel base or the distance between the centers of said front and rear wheels is less than 40 inches.

6. A pedal lever bicycle as defined in claim 1 wherein said bicycle includes means for permitting fully independent movement of each of said pedal levers.

7. A pedal lever bicycle as defined in claim 1 wherein said pedal levers have an angular travel in the order of ninety degrees, with the power stroke commencing slightly above the horizontal.

8. A pedal lever bicycle as defined in claim 1 wherein two chains and two sprockets are provided, and wherein the front end of each chain is secured by a spring to the front portion of the corresponding pedal lever.

9. A pedal lever bicycle as defined in claim 8 further including a pair of idler wheels, one of which is mounted in engagement with each said chain between the sprocket and the spring by which the chain is secured to the front portion of each pedal lever.

10. A pedal lever bicycle as defined in claim 1 wherein said seat is mounted nearly above but slightly forward of the center of said rear wheel, and wherein the wheel base of said bicycle is about 38 inches or less.

11. A pedal lever bicycle as defined in claim 1 wherein two chains and two sprockets are provided, and resilient means are provided for securing the front end of each chain to the front portion of the corresponding pedal lever.

12. A pedal lever bicycle having a wide range of mechanical advantage ratios, comprising:

a front wheel, a rear wheel, and a frame interconnecting said front and rear wheels;

a pedal lever having front and rear portions;

central pivoting mounting means for said pedal lever mounted at an elevation above the center of the rear wheel, and behind the front of the rear wheel;

sprocket means mounted coaxially with said rear wheel for driving said bicycle;

chain means for engaging said sprocket means to supply power to said sprocket from said pedal lever;

slider means mounted for movement on said rear portion of said pedal lever and connected to one end of said chain;

resilient means connected to the other end of said chain and to the front portion of said pedal lever to maintain said chain under tension;

said rear portion of said pedal lever being of a dog-leg configuration with an initial short portion, having a length less than one-third of the total length of said rear portion of said pedal lever, extending sharply upward relative to the front portion of said pedal lever, when said front portion of said pedal lever is substantially in the horizontal orientation;

means for providing a force from said chain toward moving the slider toward said pivoting mounting means when said rear portion of said pedal lever is in the raised position, and for providing a force on said slider in the opposite direction when said rear portion is in its lower position;

means for constraining the movement of the rear portion of the pedal lever to the rear of the normal position of a rider's legs; and a rear brake mechanism, and means for mounting the rear brake mechanism toward the front of the rear wheel at a low point on the frame, whereby interference with the rear portion of the pedal lever is precluded.

13. A pedal lever bicycle as defined in claim 12 further comprising resilient stop means for engaging said pedal lever to limit the stroke of said pedal lever in both directions.

14. A pedal lever bicycle as defined in claim 13 wherein said resilient stop means has an eccentric mounting configuration.

15. A pedal lever bicycle as defined in claim 12 wherein the wheel base or the distance between the centers of said front and rear wheel is less than 40 inches.

16. A pedal lever bicycle as defined in claim 12 wherein said rearwardly extending portions of said pedal levers are spaced four inches or less apart from one another.

17. A pedal lever bicycle as defined in claim 12 wherein the two rearwardly extending frame members which support the rear hub of the bicycle extend parallel and close to the wheel at the front of the rear wheel, support the pivot points for the pedal levers, and then flare outwardly to engage the two sides of the rear hub of the rear wheel.

* * * * *